United States Patent [19]

Peters

[11] 4,209,040

[45] Jun. 24, 1980

[54] SEAL MEANS FOR HIGH PRESSURE CONTROL VALVES

[75] Inventor: Clifford M. Peters, Longview, Tex.

[73] Assignee: W-K-M Wellhead Systems, Inc., Shreveport, La.

[21] Appl. No.: 939,165

[22] Filed: Sep. 1, 1978

[51] Int. Cl.² .................... F16K 31/122; F16K 41/04
[52] U.S. Cl. .......................... 137/625.48; 137/625.68; 137/625.26; 251/325; 251/DIG. 1
[58] Field of Search ...................... 137/625.38, 625.48, 137/625.68, 625.26; 251/DIG. 1, 325

[56] References Cited

U.S. PATENT DOCUMENTS

| | | | |
|---|---|---|---|
| 2,645,450 | 7/1953 | Chessman | 137/625.48 X |
| 3,000,610 | 9/1961 | Bryant | 251/DIG. 1 |
| 3,138,175 | 6/1964 | Chilcoat | 137/625.48 X |
| 3,415,282 | 12/1968 | Zoludow | 137/625.48 |
| 3,744,523 | 7/1973 | Hill | 137/625.68 |
| 3,790,128 | 2/1974 | Hempelmann et al. | 137/625.38 X |
| 3,927,830 | 12/1975 | Briski | 137/625.68 X |

FOREIGN PATENT DOCUMENTS 1207849 11/1959 France .................................. 137/625.48

*Primary Examiner*—Arnold Rosenthal
*Attorney, Agent, or Firm*—Eugene N. Riddle

[57] ABSTRACT

A valve device consisting of a valve body with a bore slidably receiving a valving plunger (30, 34) and having openings (64, 68) spaced along the bore wall for carrying high pressure controlling or controlled fluid. Interposed between the openings is soft seal means, such as O-rings (48, 54), embedded in suitable recessing in the bore wall. The valve plunger has an internal passage (76) with longitudinally spaced ports or ducts (78, 80) opening through the plunger wall and movable with the plunger, selectively, between positions on the same side of the seal means and on opposite sides thereof for connecting the body openings. The plunger transverse ducts (78, 80) are not of appreciably greater cross-sectional dimensions, longitudinally of the plunger, than said soft seal means (48, 54) and is closely confined on all sides, when exposed to a plunger port, by adjacent body and plunger wall structure so that distortion and extrusion of the seal, under high pressure in the plunger passage, is prevented.

1 Claim, 4 Drawing Figures

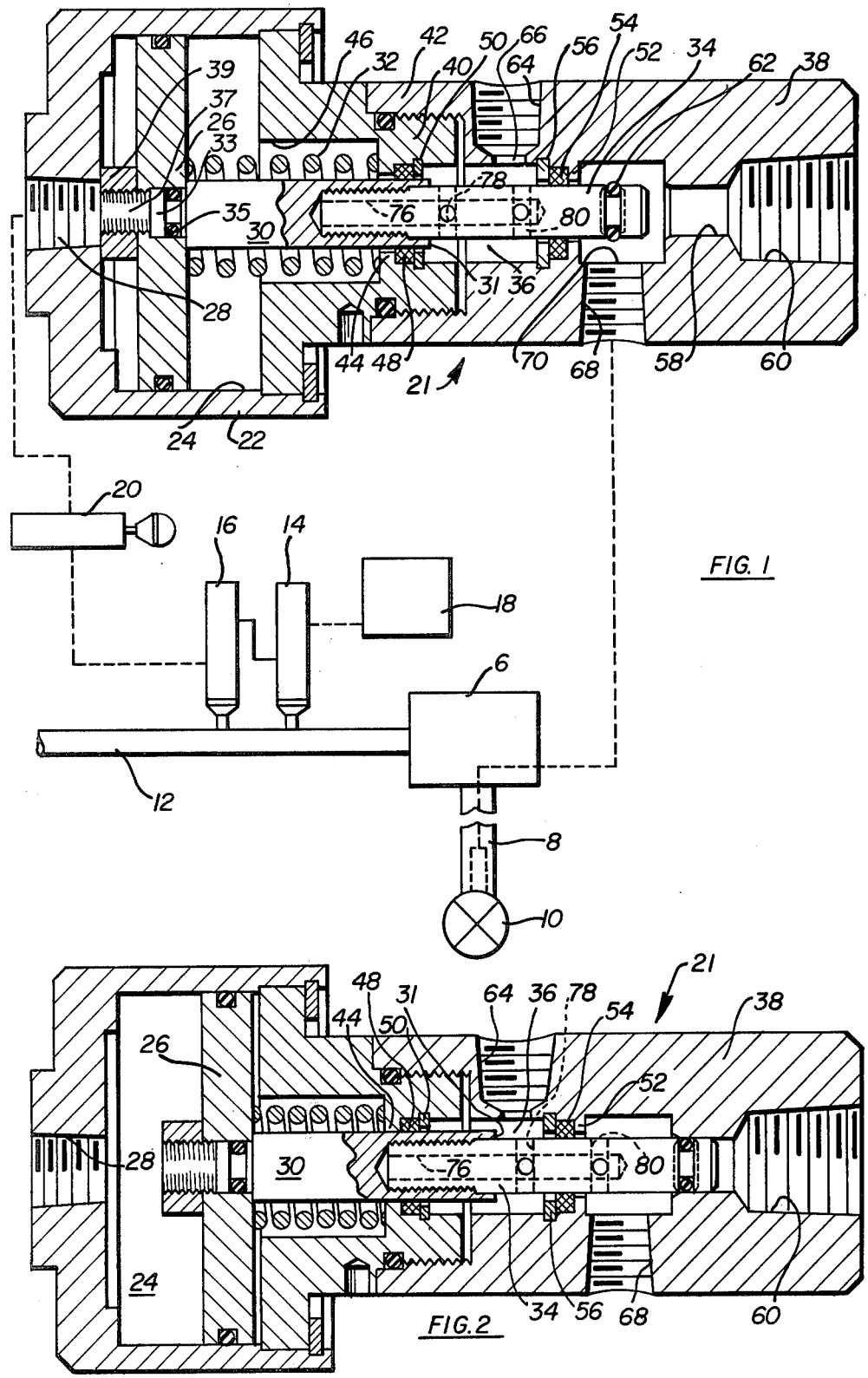

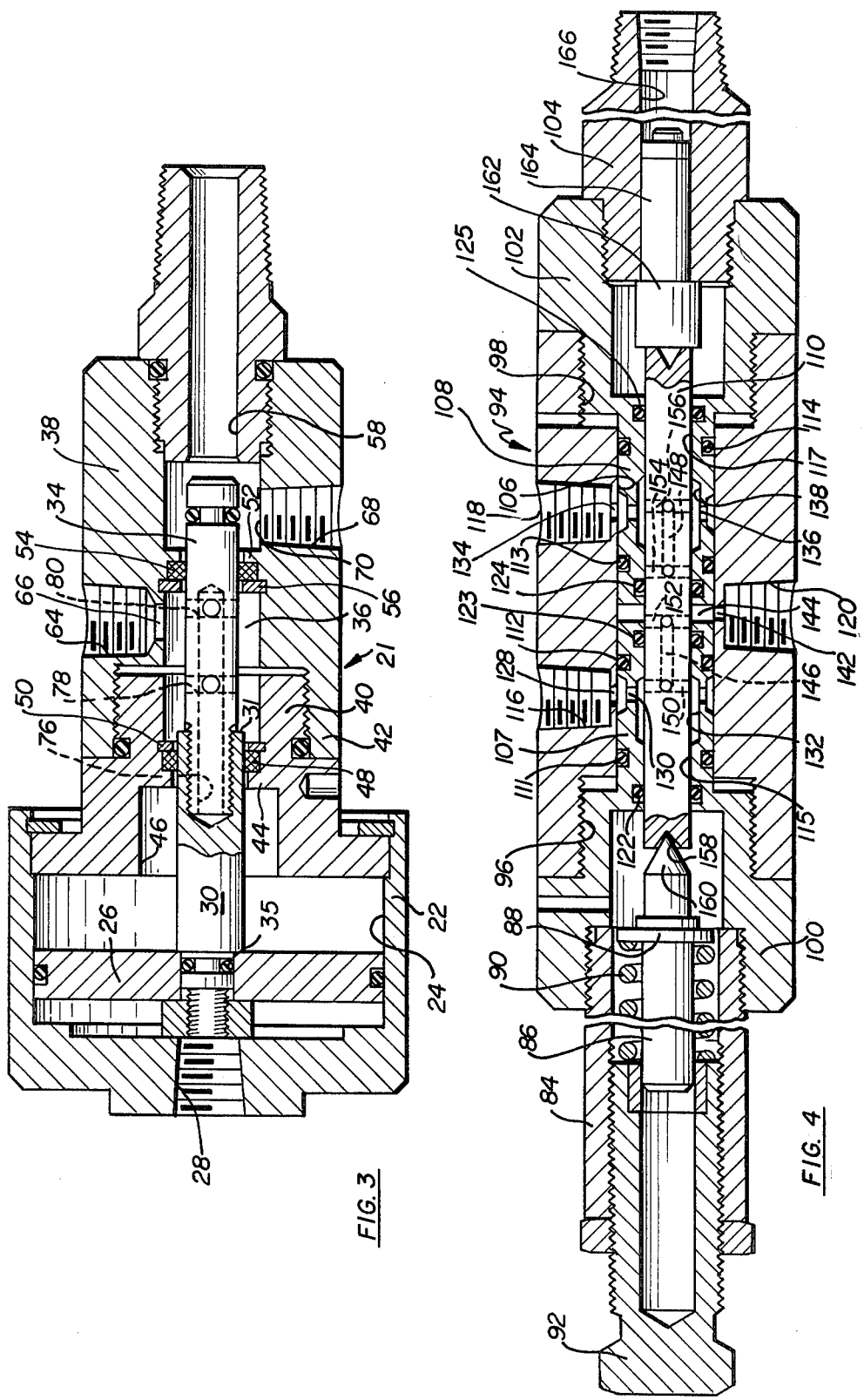

SEAL MEANS FOR HIGH PRESSURE CONTROL VALVES

FIELD OF THE INVENTION

This invention relates to valve devices, particularly of the sliding plunger type, for controlling flow and/or distribution of fluids at high pressures, for instance, in excess of 5000 p.s.i. More specifically, the invention consists in the arrangement of valve plunger passaging and soft seals in the valve body so as to prevent leakage, yet avoid distortion or extrusion of the seals from their receiving grooves or recesses when directly exposed to the high pressured controlling or controlled fluid.

BACKGROUND OF THE INVENTION

Such a valve device may consist of a valve body and a plunger for directing the controlling and/or controlled fluid to and from the device. Typically, O-ring seal means is provided, between the body parts and between the bore wall and plunger, which seal means is passed by the plunger or passes over a port to effect the desired valving action. Peters et al U.S. Pat. No. 3,044,492 discloses a pilot valve embodying such an arrangement in which O-rings on the valve plunger move in and out of an enlarged valve chamber to selectively connect a pressured fuel inlet to one or the other outlet leading to a controlled device. If the O-ring seal, when in the valve chamber, is exposed to extremely high pressure, say 10,000 p.s.i., there is a danger that the seal ring will be extruded from its groove to render the device inoperative under certain conditions.

SUMMARY OF THE INVENTION

Accordingly, the main object of the present invention is to provide means for mounting and supporting seal means for a valve device of the type described above, capable of withstanding very high controlling or controlled fluid pressures without distortion or extrusion, while maintaining a bubble tight seal about the valve plunger. In accordance with the invention, there are disclosed herein several types of valve devices, including dump and pilot valves, each having a valve body with a longitudinal bore into which longitudinally spaced inlet and outlet ports open. O-rings fit snugly in grooves in the wall of the bore or the bore of a ported sleeve sealingly secured therein. The valve plunger fits slidably in the bore and has an internal longitudinal passage and transverse ducts connecting the passage with ports in the external surface of the plunger. The body and plunger ports and seals are judiciously spaced to effect the desired inter-connection of body ports through said passage and ducts, or blockage of such inter-connection as the valve plunger shifts to cause at least one of its ports to pass over the soft seals and the body ports. The inner faces of the soft seals are in sealing contact with the plunger wall so as to be exposed at times to the full pressure of the fluid being controlled. However, the soft seal so exposed is not distorted or dislodged, as has been the case with previous somewhat similar arrangements, due to the fact that at least portions of the bore and plunger walls extend on all sides of the seal groove so as to mechanically confine the seal in its groove.

In addition, in one form of the invention, the plunger has opposed differential areas which provide for automatic shifting of the plunger to one position, say a fail-safe position.

BRIEF DESCRIPTION OF THE DRAWINGS

In the accompanying drawings which illustrate the invention, FIG. 1 is a schematic view of a downhole safety valve arrangement for an oil or gas well, with a dump valve detailed in longitudinal section and showing the novel stable seal arrangement.

FIG. 2 is a similar view of the dump valve of FIG. 1 in a different position.

FIG. 3 is a sectional view similar to FIG. 2, with the plunger shifted to dump position, and the spring being omitted.

FIG. 4 is a cross-section detailing a high-low sensing pilot valve embodying the invention.

DETAILED DESCRIPTION OF THE DRAWINGS

FIG. 1 shows a wellhead 6 on a well 8 having a downhole safety valve 10, which responds to excessive or deficient downhole pressure to cut off the flow of well fluids (gas, oil, etc.) to the wellhead, and delivery pipe line 12. High and low pressure sensors 14 and 16 communicate with the delivery line to initiate corrective flow of hydraulic fluid from supply 18 through relay pilot 20 and dump valve 21 to wellhead 6 and safety valve 10.

Dump valve 21 comprises a first body portion 22 forming a piston chamber 24 in which works a piston 26 constantly urged leftwardly to a stop position closing end opening 28 which is connected to hydraulic fluid supply 18. The righthand side of piston 26 abuts the adjacent end of a plunger extension 30 extending axially within a piston biasing spring 32. Plunger extension 30 is threadedly secured at its opposite end 31 to the adjacent end of main plunger member 34 which extends axially through annular valve chamber 36 formed by a bore within second body portion 38. Plunger extension 30 has a restricted terminal extension 33 with an O-ring seal 35 received in a bore 37 in piston 26. First body portion 22 has an externally threaded bore 40 secured in internally threaded cup 42 in the second body portion 38.

Plunger Extension 30 extends through a restricting collar 44 between enlarged bore portion 46 in piston chamber 24 and the left end of valve chamber 36, O-ring 48 is mounted adjacent collar 44 and secured by a split ring 50. At its opposite end, the main plunger 34 slides through internal collar 52 and is there sealed by an O-ring 54 also held in place and confined by a split ring 56. Main plunger member 34 is positioned to enter restricted orifice or bore 58 in fluid communication with adjacent threaded fitting 60, and is provided with an O-ring seal 62. An opening 64 for hydraulic fluid supply opens into the left end portion of valve chamber 36 through a port or orifice 66 in the wall defining chamber 36. A second threaded opening 68 opens through a port 70 into the right end portion of valve chamber 36 on the side of O-ring seal 54 opposite port 66. Opening 68 is connected to the controlled downhole safety valve 10. The O-rings which control very high pressures, as 48 and 54, are made of a relatively soft elastomeric material of durometer hardness around ninety (90) for best results in order to remain bubble tight. A durometer hardness of between around fifty (50) and one hundred thirty (130) will provide satisfactory results.

FIG. 2 shows the form of FIG. 1 with piston 26 urged rightwardly by hydraulic pressure from the high-low sensors 14, 16, indicating existence of pressures in the desired range in flowline 12. Due to the differential area at the right end 31 of plunger extension 30, any hydraulic pressure in valve chamber 36 will urge piston 26 leftwardly against the control pressure in hydraulic fitting 28. Pilot supply pressure applied through opening 28, indicating proper pressure range in pipe 12, will urge piston 26 and the plunger rightwardly against this differential force and spring 32. Spring 32, provided as a precaution, will close opening 28 to hydraulic fluid supply 18 in case of failure of pressure in valve chamber 36.

FIG. 3 is similar to FIGS. 1 and 2, but with the spring 32 omitted. However, a light spring 32, preferably will be provided as a safety feature, in case of failure of pressure, permitting the downhole safety valve actuator to dump and the safety valve to close.

In each of the forms of FIGS. 1, 2, and 3, an internal, longitudinal passage 76 in the main valve plunger member 34 is connected to the external surface of the plunger member by cross or radial ports or ducts 78 and 80 each in quadrature, through which hydraulic fluid is conducted across soft O-ring seal 54 (FIG. 2). During an interval as valve plunger 34 shifts, ducts or ports 80 confront the plunger rubbing face of seal 54 and pressure in the valve chamber is thereby applied directly through these ports against the seal 54. However, since the seal is snugly confined at its bottom and both sides by body part 38, ring or collar 52, and split ring 56; and the cross sectional area of each cross duct 80 is not greater than the thickness of the plunger engaging surfaces of seal 80, collar 52, and split ring 56; radial outward pressure applied through ducts 80 cannot extrude the seal from its groove. In other words, there is no free space immediately around the seal, except ducts or ports 80, either within the surfaces of the bore wall or the plunger member 34, into which the seal can extrude even at very high pressures.

Operation of Embodiment Shown in FIGS. 1, 2, and 3

As long as high-low sensors 14 and 16 indicate pressure in line 12 is in the proper range, piston 26 and the plunger will be maintained as shown in FIG. 2, directing hydraulic fluid from opening 64 to opening 68 and the downhole safety valve 10, holding the latter open. When the optimum pressure range in line 12 is exceeded or deficient, the pressure sensors will reduce the pressure applied against piston 26, permitting it to shift leftwardly, under the influence of pressure applied to differential plunger area 31 and spring 32, where used, opening dump port 58 to a sump and permitting the downhole safety valve to close. As previously explained, even very high hydraulic pressures applied to seal 54 cannot distort the seal or extrude it from its groove because of the close confinement of the seal within surrounding valve body parts and plunger parts surrounding radial passages 80.

FIG. 4 shows the soft seal protecting feature applied to a high pressure sensor valve designed to handle pressures of 10,000 psi or higher. The valve body is formed by a left end extension 84 enclosing an actuating stem 86 with a collar 88 against which a compression spring 90 bears. The opposite end of the spring bears against an adjusting knob 92.

An intermediate body part 94 has internal openings 96 and 98 at its ends threadedly secured by means of adapters 100 and 102 to body extension 84 and a fitting 104 for connection to the pressure source to be monitored. Intermediate body part 94 has a reduced central bore 106 in which is received a pair of sleeves 107 and 108 with central bores 115 and 117 and connected at their opposite ends to and secured in position by adapters 100 and 102. O-ring seals 111, 112, 113, and 114, are provided between the abutting surfaces of body part 102 and sleeves 107 and 108. Body part 102 has threaded high-low pressure hydraulic inlets 116 and 118 and a threaded outlet 120 for connection to the controlled instrumentation. O-ring soft seals 122, 123, 124, and 125 are provided between sleeve bore 115 and 117 and main plunger member 110.

Hydraulic inlet 116 connects through a port 128 in the body part and annulus 130 in sleeve 107 with an annular recess or valve chamber 132 in the wall of sleeve bore 115 between plunger seals 122 and 123. Inlet 118 connects through ports 134 in the body part and 136 in sleeve 108 with an annular recess of valve chamber 138 in the latter sleeve between soft seals 124 and 125. Outlet 120 connects through port 142 with the annular clearance 144 between sleeves 107 and 108.

Main plunger part 110 has a pair of spaced apart central longitudinal passages 146 and 148, each connected at its ends by cross or radial ducts 150 and 152 and 154 and 156 to the outer surface of the plunger. At its left end, plunger part 110 has a depression 158 against which the pointed end 160 of stem 86 bears for transmitting the force of spring 90 to plunger part 110. At its opposite end, part 110 abuts a piston 162 with a valving extension 164 which may enter and close the bore 166 in fitting 104.

OPERATION OF EMBODIMENT OF FIG. 4

As long as the pressure being monitored is in the desired range the valve plunger will be in the position shown with hydraulic pressure transmitted through inlet 116 to valve chamber recess 132, thence through cross ducts 150, internal passage 146 and cross ducts 152, and clearance 144 and outlet 120 to the corrective instrumentation, maintaining the latter in normal operative condition. If excessive pressure should be applied to plunger extension 164 and piston 162, plunger 110 would be shifted leftwardly against spring 90 to move both cross ducts 150 and 152 on the left side of seal 123 and thereby separated from clearance 144. At the same time, cross ducts 154 will move leftwardly across seal 124, thus communicating clearance 144 and outlet 120 with low-pressure inlet 118, permitting the controlled instrumentality to vent through 120 and 118.

Each of the seals in the plunger engaging bores 115 and 117 of the sleeves 107 and 108 is mounted, as in the first forms, to withstand extremely high pressures. At no time is any of these seals released from the confining surface areas of the sleeve bores and the plunger at the same time as it is also exposed to high fluid pressure. For instance, seal 123 may be passed over by duct 152 when transmitting pressured fluid flow in either direction from outlet 120. While portions of seal 123 are abreast of ducts 152, wholly or in part, all adjacent parts of the seal are supported and confined by portions of the plunger or confronting bore. This is made possible by the unique channeling of the stream of pressured fluid (liquid or gas) being manipulated by the plunger internally through the plunger from restricted ducts therein, instead of through recesses in faces of the plunger or valve body bore.

The inventive features may be utilized in other valving arrangements than those shown. Seals 123 and 124, particularly are formed of a soft elastomeric material of a durometer hardness between around fifty (50) and one hundred thirty (130) for high fluid pressures, such as over 5,000 psi. Best results are obtained with a durometer hardness of around one hundred (100). With a soft elastomeric seal, tolerances between adjacent parts can be relatively large while bubble tight sealing is effected by the soft seals. Also, foreign matter will not tend to settle or collect about a soft seal. It is to be noted that the diameter of seals 123 and 124 is around the same diameter as the diameter of the cross ducts 150, 152, 154, and 156. Thus, the cross ducts do not provide a void space adjacent seals 123 and 124 into which the soft seals can be extruded. The novel arrangement of seal confining walls leaves only the portion of the seal directly exposed to a port or duct containing the pressured fluid so that the seal material cannot be extruded from its receiving groove.

Various modifications may be made as will occur to those skilled in the art and the exclusive use of all modifications as come within the scope of the appended claims is contemplated.

What is claimed is:

1. A valve device comprising:
   a valve body presenting an elongate bore having opposite ends and inlet and outlet openings in said valve body communicating with said bore at locations between said opposite ends;
   a pair of adapters threaded into opposite ends of said valve body and having integral hollow sleeves extending into said bore from the opposite ends thereof, said sleeves having spaced apart inner ends separated by a clearance gap providing fluid communication between said bore and the interiors of the sleeves, said gap being adjustable in size by threaded movement of said adapters relative to said valve body to vary the distance between the inner ends of the sleeves;
   an annular groove in each sleeve and an O-ring seal mounted in each groove, each O-ring seal being of a soft elastomeric material having a durometer hardness between about 50 and 130;
   an elongate plunger received in said sleeves for sliding movement therein in sealing contact with said O-ring seals, said plunger having a pair of spaced apart passages extending generally along its longitudinal axis adjacent the O-ring seals;
   a pair of ports extending transversely of each passage to permit fluid flow through one passage between the inlet and outlet openings in one position of the plunger, one port of each passage passing over the corresponding O-ring seal when the plunger slides from said one position to another position wherein fluid flow between the inlet and outlet openings is blocked; and
   surfaces defined by walls around said ports and O-ring seals which substantially, completely and positively confine the O-ring seals when exposed to said ports to prevent extrusion of the O-ring seals, said ports each having a dimension longitudinally of the plunger which is not substantially greater than the corresponding dimension of each O-ring seal in a direction longitudinally of said sleeves.

* * * * *